(12) United States Patent
Ahn et al.

(10) Patent No.: US 10,060,534 B2
(45) Date of Patent: Aug. 28, 2018

(54) SEALING STRUCTURE FOR TURBINE

(71) Applicant: DOOSAN HEAVY INDUSTRIES CONSTRUCTION CO., LTD., Gyeongsangnam-do (KR)

(72) Inventors: Jun Ho Ahn, Gyeongsangnam-do (KR); Yong Kwoen Jang, Gyeongsangnam-do (KR)

(73) Assignee: DOOSAN Heavy Industries Construction Co., LTD, Gyeongsangnam-do (KR)

( * ) Notice: Subject to any disclaimer, the term of this patent is extended or adjusted under 35 U.S.C. 154(b) by 0 days.

(21) Appl. No.: 15/378,799

(22) Filed: Dec. 14, 2016

(65) Prior Publication Data

US 2017/0167613 A1   Jun. 15, 2017

(30) Foreign Application Priority Data

Dec. 14, 2015   (KR) .................. 10-2015-0178538

(51) Int. Cl.
*F16J 15/44*   (2006.01)
*F16J 15/3288*   (2016.01)
(Continued)

(52) U.S. Cl.
CPC ........... *F16J 15/3288* (2013.01); *F01D 11/08* (2013.01); *F01D 11/12* (2013.01); *F16J 15/3248* (2013.01);
(Continued)

(58) Field of Classification Search
CPC .. F16J 15/3288; F16J 15/3248; F16J 15/4472; F16J 15/3232; F16J 15/00;
(Continued)

(56) References Cited

U.S. PATENT DOCUMENTS 5,316,318 A   5/1994 Veau
5,423,557 A *   6/1995 De Villepoix ............ B64C 9/00
                                                                   277/345

(Continued)

FOREIGN PATENT DOCUMENTS

GB   2301635 A   12/1996
JP   07217452 A   8/1995
(Continued)

OTHER PUBLICATIONS

"Notification of Reasons for Refusal" issued by Japan Patent Office.
(Continued)

*Primary Examiner* — Nathan Cumar
(74) *Attorney, Agent, or Firm* — INVENSTONE Patent, LLC

(57) ABSTRACT

A sealing structure for a turbine includes a recessed portion formed around a rotary body and having an annular shape, an annular packing body fixed in a coupling groove of a stationary body, a support member disposed at a central portion of the packing body, a brush seal, one end of which is fixed to the support member while the other end of the brush seal is disposed in the recessed portion, and a tooth portion disposed in at least one side of the packing body.

18 Claims, 11 Drawing Sheets

(51) Int. Cl.
*F01D 11/12* (2006.01)
*F16J 15/3248* (2016.01)
*F01D 11/08* (2006.01)
*F16J 15/447* (2006.01)
*F01D 5/22* (2006.01)

(52) U.S. Cl.
CPC ........... *F16J 15/4472* (2013.01); *F01D 5/225* (2013.01); *F05D 2220/31* (2013.01); *F05D 2220/32* (2013.01); *F05D 2240/56* (2013.01)

(58) Field of Classification Search
CPC ........ F01D 11/12; F01D 11/003; F01D 11/08; F01D 5/225; F01D 11/00; F01D 5/22; F01D 5/00; F05D 2220/32; F05D 2220/31; F05D 2240/56; F05D 2220/00; F05D 2240/00
USPC ......................................................... 277/355
See application file for complete search history.

(56) References Cited

U.S. PATENT DOCUMENTS

| | | | |
|---|---|---|---|
| 6,116,608 A * | 9/2000 | Wolfe | F01D 11/08 277/355 |
| 6,161,836 A * | 12/2000 | Zhou | F16J 15/3288 277/355 |
| 6,168,377 B1 * | 1/2001 | Wolfe | F01D 11/001 415/174.2 |
| 6,439,844 B1 | 8/2002 | Turnquist et al. | |
| 2004/0101403 A1 * | 5/2004 | Turnquist | F01D 11/02 415/174.2 |
| 2012/0177483 A1 | 7/2012 | Ali et al. | |
| 2013/0094957 A1 * | 4/2013 | Mindock, III | F01D 11/003 415/230 |
| 2015/0218959 A1 * | 8/2015 | Barb | F01D 11/22 415/173.1 |

FOREIGN PATENT DOCUMENTS

| | | |
|---|---|---|
| JP | 2001173796 A | 6/2001 |
| JP | 2004044428 A | 2/2004 |
| JP | 2013155784 A | 8/2013 |
| JP | 2013238225 A | 11/2013 |
| WO | 0155624 A1 | 8/2001 |

OTHER PUBLICATIONS

An extended European search report issued by the European Patent Office dated Mar. 29, 2017 in corresponding European Application No. 16202236.2.

Japanese Office Action issued by the Japanese Patent Office dated Aug. 1, 2017 in connection with Japanese Patent Application No. 2016-220562.

* cited by examiner

Related Art

Related Art

Related Art

SEALING STRUCTURE FOR TURBINE

CROSS-REFERENCE TO RELATED APPLICATIONS

This application claims priority to Korean Patent Application No. 10-2015-0178538, filed on Dec. 14, 2015, the disclosure of which is incorporated herein by reference in its entirety.

BACKGROUND

Exemplary embodiments of the present disclosure relate to a sealing structure for a turbine, and more particularly, to a sealing structure for a turbine, capable of maintaining the sealing force of a bucket tip portion, regardless of axial movement of a rotary body, by improving the structure of a brush seal and a labyrinth seal, which are disposed in a stationary body, and the shape of the contact portion of the bucket tip portion which is disposed in the rotary body.

In general, turbines are power generation apparatuses which convert heat energy of fluid such as gas or steam into rotational force as mechanical energy, and each includes a rotor having a plurality of buckets to axially rotate by fluid and a casing which is installed to surround the rotor and has a plurality of diaphragms.

Among these turbines, a gas turbine includes a compressor section, a combustor, and a turbine section. In the gas turbine, outside air is introduced and compressed by the rotation of the compressor section and is then transferred to the combustor, and combustion is performed by the mixture of compressed air and fuel in the combustor. High-temperature and high-pressure gas generated by the combustor drives a generator by rotating the rotor of the turbine while passing through the turbine section.

In a steam turbine, a high-pressure turbine section, an intermediate-pressure turbine section, and a low-pressure turbine section are interconnected in series or in parallel to rotate a rotor. When the high-pressure turbine section, the intermediate-pressure turbine section, and the low-pressure turbine section are interconnected in series, these share one rotor.

In the steam turbine, each turbine has a diaphragm and a bucket with the rotor in a casing interposed therebetween. Steam rotates the rotor while passing through the diaphragm and the bucket, thereby enabling a generator to be driven.

Since each of the gas turbine and the steam turbine has a structure in which a rotary body (a bucket) is rotated relative to a stationary body (a diaphragm), a high-temperature and high-pressure fluid leaks into a gap between the stationary body and the rotary body and such fluid leakage causes the deterioration of energy efficiency due to a power loss. Accordingly, efforts for reduction in fluid leakage occurring in the gap between the rotary body and the stationary body are consistently conducted.

The gap between the rotary body and the stationary body is first decreased to reduce the fluid leakage, but there are various limits in decreasing the gap.

For example, when the gap is too small, vibration is caused by rubbing due to the interference between the rotary body and the stationary body when the rotary body axially rotates, resulting in serious damage to the turbine.

Meanwhile, since the rotary body and the stationary body are heated by hot steam introduced from the boiler in the steam turbine, the rotary body and the stationary body are expanded or contracted from several mm to several tens of mm according to positions thereof when the steam turbine is operated or stopped. In this case, the rotary body and the stationary body are differently expanded because of being made of different materials, and are expanded in different directions according to the structure of the turbine. For this reason, rubbing occurs due to the interference caused while the rotary body and the stationary body are operated.

FIGS. 1A to 1C illustrate a sealing structure between a bucket tip portion of a rotary body and a casing of a stationary body 1 in the related art. Various efforts have been attempted for a long time in order to enhance the sealing between the stationary body 1 and the rotary body. As a result, the arrangement of a labyrinth seal and the shape of a bucket tip portion are changed.

First, referring to FIG. 1A, the bucket tip portion 5 forms a flat portion, and the stationary body 1 has a sealing structure in which a support 2 for fixing a brush seal 4 is disposed at the central portion of the stationary body and labyrinth seals 3 are disposed at both sides of the stationary body. This structure may not prevent the leakage of fluid when the bucket tip portion 5, the labyrinth seals 3, and the brush seal 4 are dislocated due to the excessive axial movement of the rotary body.

In addition, referring to FIG. 1B, the bucket tip portion 5 forms a protrusion portion as another shape, and the stationary body 1 has a sealing structure in which a brush seal 4 is disposed at the central portion of the stationary body and labyrinth seals 3 are disposed at both sides of the stationary body. Similarly, this structure may not prevent the leakage of fluid when the bucket tip portion 5, the labyrinth seals 3, and the brush seal 4 are dislocated due to the excessive axial movement of the rotary body. Moreover, the tooth portions of the labyrinth seals 3 may be damaged due to the collision with the protrusion portion of the bucket tip portion 5.

FIG. 1C illustrates a structure in which tooth portions 7 of labyrinth seals are disposed at the bucket tip portion 5 in order to improve the damage of the labyrinth seals 3 illustrated in FIG. 1B. In this case, when the rotary body excessively axially moves, both of the brush seal 4 and the tooth portions 7 of the labyrinth seals may be worn or damaged due to the collision therebetween. This may deteriorate sealing force in the long time and may ultimately cause the deterioration of turbine power.

BRIEF SUMMARY

The present disclosure has been made in view of the above-mentioned problems, and an object thereof is to provide a sealing structure for a turbine, capable of maintaining the sealing force of a bucket tip portion, regardless of axial movement of a rotary body, by improving the structure of a brush seal and a labyrinth seal, which are disposed in a stationary body, and the shape of the contact portion of the bucket tip portion which is disposed in the rotary body.

Other objects and advantages of the present disclosure can be understood by the following description, and become apparent with reference to the embodiments of the present disclosure.

In accordance with an aspect of the present disclosure, a sealing structure for a turbine includes a recessed portion formed around a rotary body and having an annular shape, an annular packing body fixed in a coupling groove of a stationary body, a support member disposed at a central portion of the packing body, a brush seal, one end of which is fixed to the support member while the other end of the brush seal is disposed in the recessed portion, and a tooth portion disposed in at least one side of the packing body.

The support member may have a square cross-section, and one side of the support member may be fixed into the packing body while other side of the support member extends toward the rotary body.

A pair of stepped portions may be formed at both ends of the recessed portion on the rotary body, and when the rotary body is axially moved, the brush seal may come into close contact with an associated one of the stepped portions so as to block a flow of fluid.

The support member may include a first base seated in a fixing groove of the packing body, and having a first central groove portion formed therein, the first central groove portion having a circular cross-section, and a first rotary body, one side of which is formed as a circular portion having a circular cross-section and is disposed in the first central groove portion, the other side of the first rotary body being formed as an extension portion having a square cross-section to support the brush seal.

A pair of inclined portions may be formed at a portion in which the extension portion of the first rotary body is disposed in the first base, the inclined portions being inclined in different directions.

The support member may further include a first rotary shaft inserted into a through-hole formed in the first rotary body while both ends of the first rotary shaft are connected to the packing body, so as to support rotation of the first rotary body.

The first rotary body may be divided into a plurality of first rotary bodies circumferentially arranged along an inner circumference of the packing body.

First interpacking portions may be disposed at both sides of the extension portion of each of the first rotary bodies in order to block leakage of fluid between the first rotary bodies.

A pair of stepped portions may be formed at both ends of the recessed portion on the rotary body, and when the rotary body is axially moved, the brush seal may come into close contact with an associated one of the stepped portions so as to block a flow of fluid.

A pair of slight inclined portions may be formed at upper ends of the stepped portions, the slight inclined portions being inclined in different directions, and when the rotary body is axially moved, the brush seal may come into close contact with an associated one of the slight inclined portions so as to block a flow of fluid.

One of the slight inclined portions may have the same gradient as an inclined portion of the first base facing therewith.

The support member may include a second base seated in a fixing groove of the packing body, and having a second central groove portion formed therein, the second central groove portion having a fanwise cross-section, and a second rotary body, one side of which is formed as a round portion and is disposed in the second central groove portion, the other side of the second rotary body being formed as an extension portion having a square cross-section to support the brush seal.

The support member may further include a second rotary shaft inserted into a through-hole formed in the second rotary body while both ends of the second rotary shaft are connected to the packing body, so as to support rotation of the second rotary body.

The support member may further include seating grooves formed in both sides of the second central groove portion of the second base, guide bars protruding toward the seating grooves from both sides of the second rotary body, each having a curved shape, and elastic bodies disposed between the respective guide bars and the respective seating grooves.

The second rotary body may be divided into a plurality of second rotary bodies circumferentially arranged along an inner circumference of the packing body.

Second interpacking portions may be disposed at both sides of the extension portion of each of the second rotary bodies in order to block leakage of fluid between the second rotary bodies.

A pair of stepped portions may be formed at both ends of the recessed portion on the rotary body, and when the rotary body is axially moved, the brush seal may come into close contact with an associated one of the stepped portions so as to block a flow of fluid.

A pair of slight inclined portions may be formed at upper ends of the stepped portions, the slight inclined portions being inclined in different directions, and when the rotary body is axially moved, the brush seal may come into close contact with an associated one of the slight inclined portions so as to block a flow of fluid.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

A sealing structure for a turbine according to exemplary embodiments of the present disclosure will be described below in more detail with reference to the accompanying drawings.

Figure 1A:
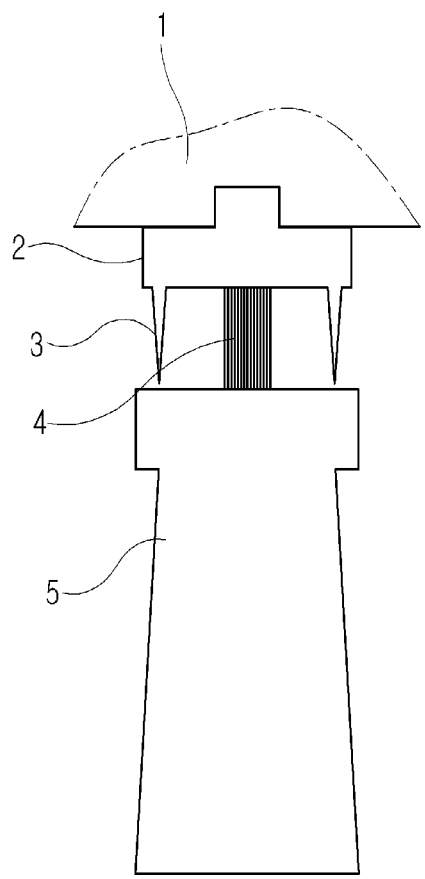
FIG. 1A is a view illustrating a sealing structure of a bucket tip portion of a turbine according to the related art.
Figure 1B:
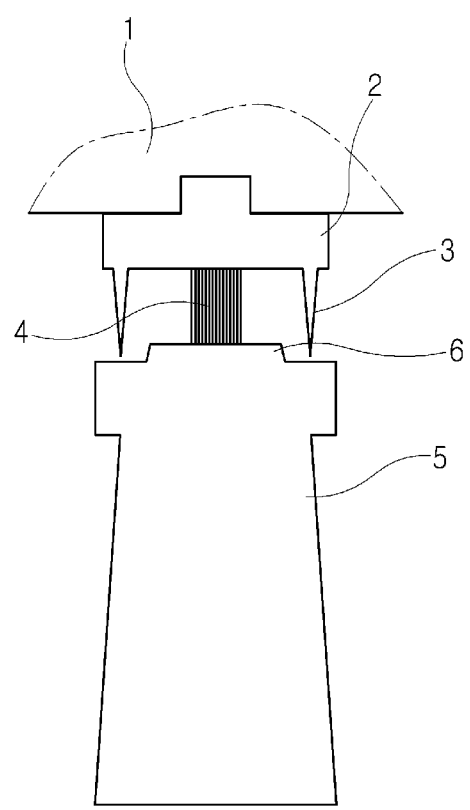
FIG. 1B is a view illustrating another sealing structure of a bucket tip portion of a turbine according to the related art.
Figure 1C:
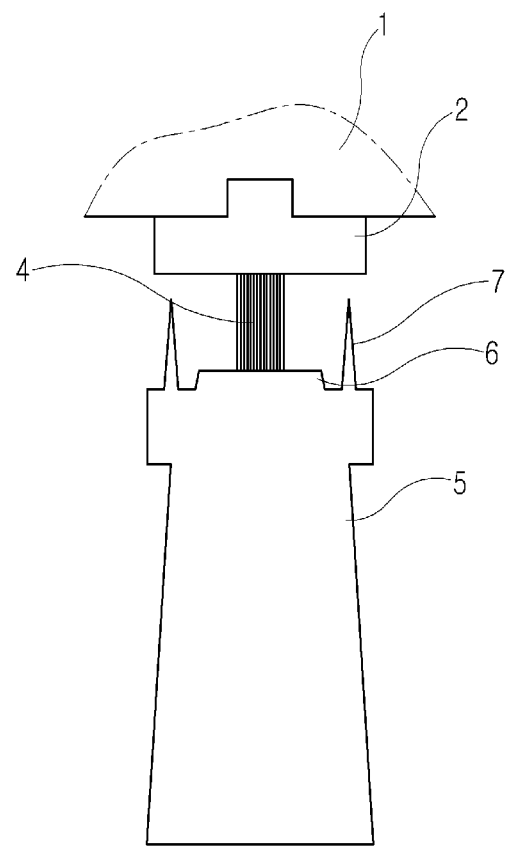
FIGS. 1C is a view illustrating still another sealing structure of a bucket tip portion of a turbine according to the related art.
Figure 2:
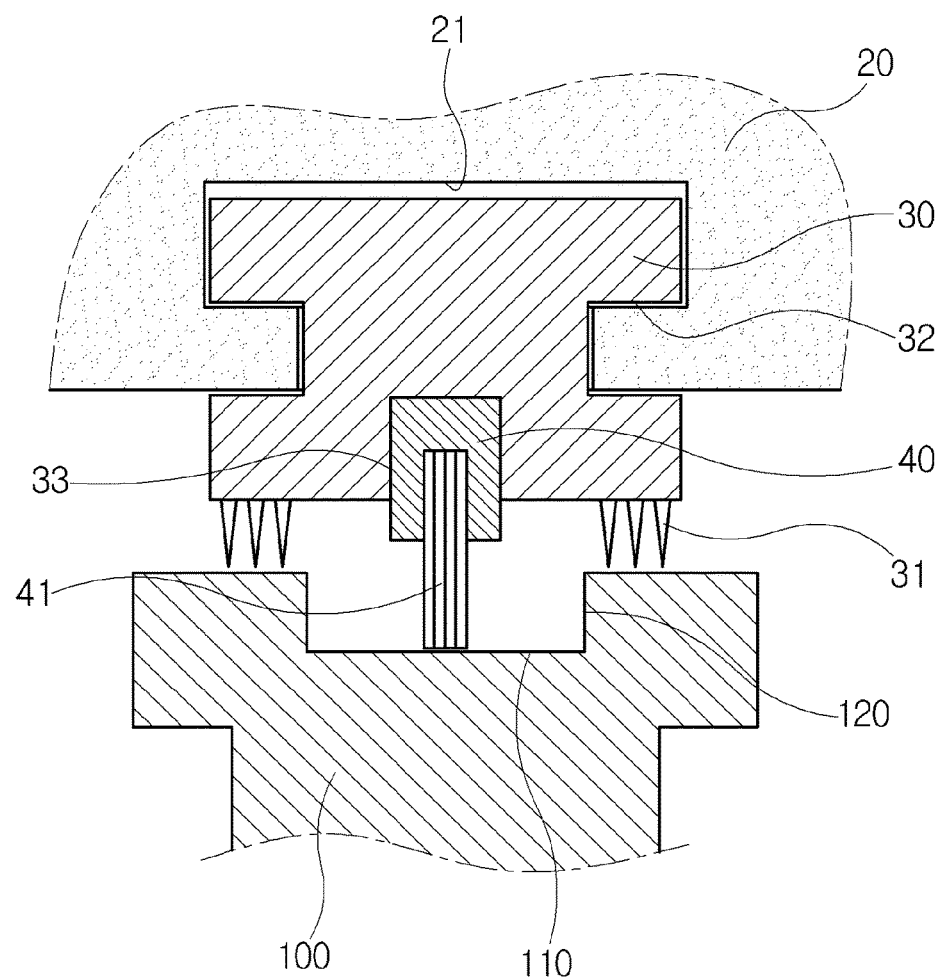
FIG. 2 is a view illustrating a sealing structure for a turbine according to a first embodiment of the present disclosure.
Figure 3:
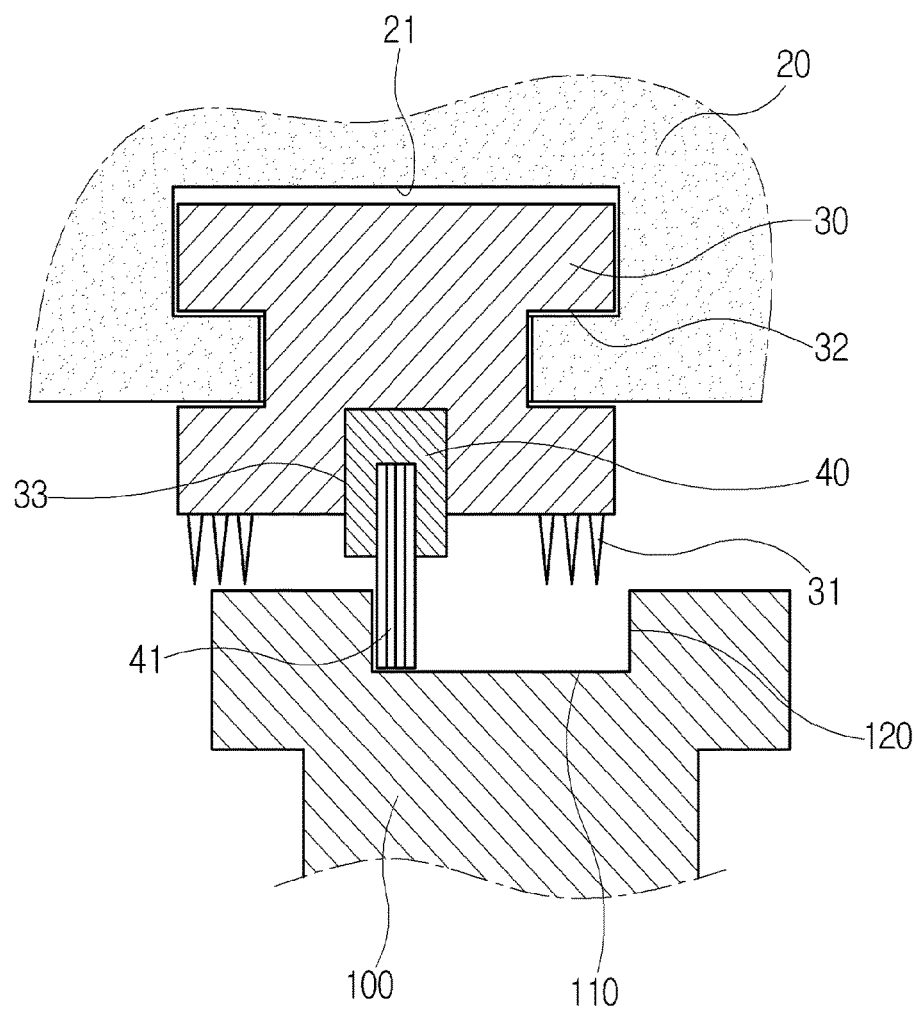
FIG. 3 is a view illustrating the operation state of the structure illustrated in FIG. 2.

FIG. 2 is a view illustrating a sealing structure for a turbine according to a first embodiment of the present disclosure. FIG. 3 is a view illustrating the operation state of the structure illustrated in FIG. 2. Referring to FIGS. 2 and 3, the sealing structure for a turbine according to the first embodiment of the present disclosure may include a recessed portion 110, a packing body 30, a support member 40, a brush seal 41, and a tooth portion 31.

First, the recessed portion 110 may have an annular shape and be formed around a rotary body. Here, the rotary body may be preferably a tip portion of a bucket 100, but the present disclosure is not necessarily limited thereto. For example, the rotary body may be a portion of a rotating component disposed in a gas turbine or a steam turbine. Hereinafter, the rotary body will be described to be the tip portion of the bucket 100 in the embodiment of the present disclosure.

The bucket 100 of the rotary body is disposed in the circumferential direction of the rotary body. Accordingly, the recessed portion 110 formed at the tip portion of the bucket 100 may have an annular shape on the tip portion of the bucket 100. FIG. 2 is an axial cross-sectional view, and it may be seen that the shape of the recessed portion 110 is formed in the tip portion of the bucket 100.

The packing body 30 may be fixed into a coupling groove 21 of a stationary body 20. The packing body 30 may have an annular shape and may be formed along the coupling groove 21 of the stationary body 20, which is formed in the circumferential direction. The packing body 30 is described to have an "H" cross-section in the embodiment of the present disclosure, but the present disclosure is not limited thereto. The shape of the coupling groove 21 formed in the stationary body 20 of the turbine may be changed so as to correspond to various forms. Both stepped portions for seating 32 of the packing body 30 are seated in the coupling groove 21 of the stationary body 20 so that the packing body 30 is fixedly coupled to the stationary body 20.

The support member 40 may be disposed in a fixing groove 33 of the central portion of the packing body 30, and may fix the brush seal 41. In this case, one side of the support member 40 is fixed to the inside of the packing body 30, and the other side thereof extends toward the rotary body. Although the support member 40 is described to simply have a square cross-section in the first embodiment of the present invention, the present invention is not limited thereto. For example, the support member 40 may have another shape according to the structure of the turbine. The support member 40 may be coupled to the fixing groove 33 by various methods such as welding and bolting.

One end of the brush seal 41 is fixed to the support member 40, and the other end thereof is disposed in the recessed portion 110.

The tooth portion 31 may be disposed on at least one side of the packing body 30. That is, the tooth portion 31 may be installed at one side (typically, the side in which fluid leakage occurs) or both sides of the packing body 30. In the embodiment of the present disclosure, the tooth portions 31 are installed at both sides of the packing body 30 to enhance sealing force. In addition, the tooth portion 31 may be a labyrinth seal, but the present disclosure is not limited thereto.

Referring to FIG. 3, when the turbine is driven and the rotary body rotates in the casing, the rotary body is not rotated at an accurate position, but is axially moved due to the collision with fluid, vibration, etc. For this reason, the positions of the brush seal 41 and the tip portion of the bucket 100 are changed.

In this case, a pair of stepped portions 120 is formed at both ends of the recessed portion 110 on the tip portion of the bucket 100. When the rotary body is axially moved, the brush seal 41 comes into close contact with the associated stepped portion 120, thereby blocking the flow of fluid. Since the tooth portion 31 is formed outward from the brush seal 41, it is possible to further suppress the leakage of fluid.

Figure 4:
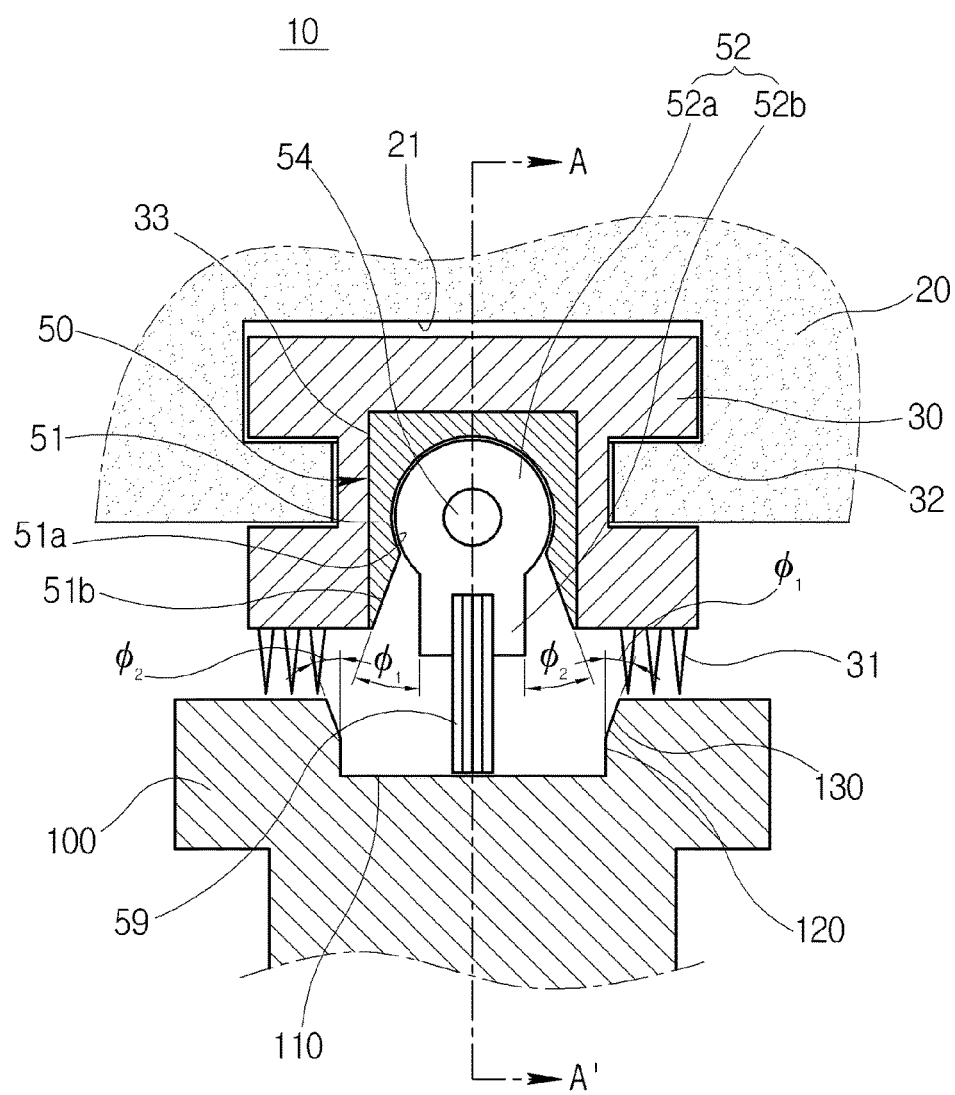
FIG. 4 is a view illustrating a sealing structure for a turbine according to a second embodiment of the present disclosure.
Figure 5:
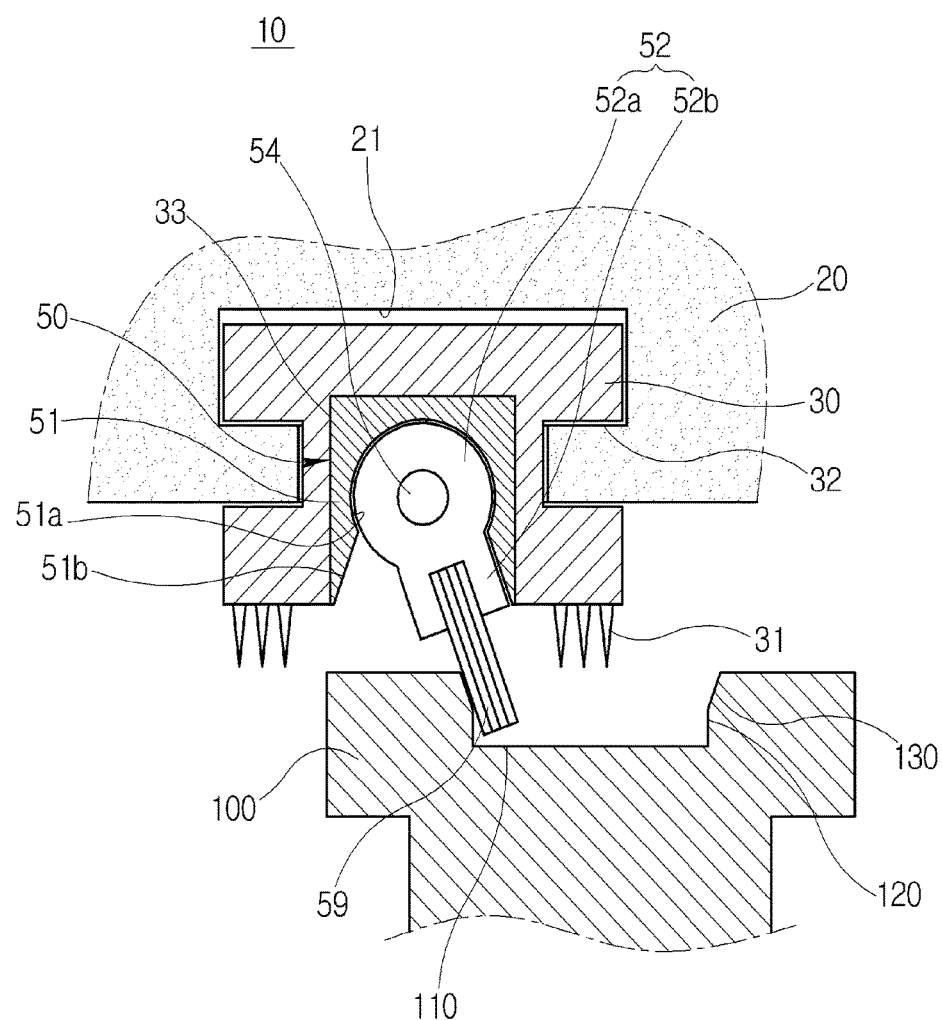
FIG. 5 is a view illustrating the operation state of the structure illustrated in FIG. 4.
Figure 6:
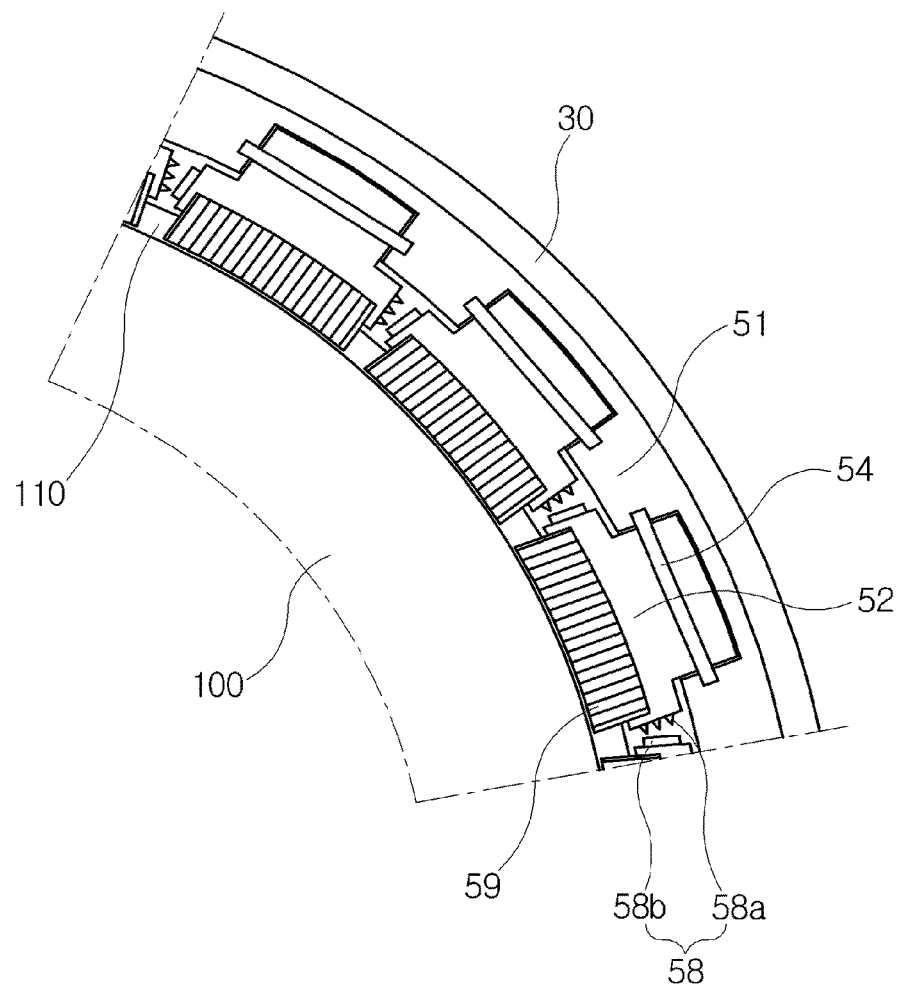
FIG. 6 is a radial cross-sectional view taken along line A-A' of FIG. 4.

FIG. 4 is a view illustrating a sealing structure for a turbine according to a second embodiment of the present disclosure. FIG. 5 is a view illustrating the operation state of the structure illustrated in FIG. 4. FIG. 6 is a radial cross-sectional view taken along line A-A' of FIG. 4.

Referring to FIGS. 4 to 6, the sealing structure for a turbine according to the second embodiment of the present disclosure may include a recessed portion 110, a packing body 30, a support member 50, a brush seal 59, and a tooth portion 31.

First, the recessed portion 110 may have an annular shape and be formed around a rotary body. Here, the rotary body may be preferably a tip portion of a bucket 100, but the present disclosure is not necessarily limited thereto. For example, the rotary body may be a portion of a rotating component disposed in a gas turbine or a steam turbine. Hereinafter, the rotary body will be described to be the tip portion of the bucket 100 in the embodiment of the present disclosure.

The bucket 100 of the rotary body is disposed in the circumferential direction of the rotary body. Accordingly, the recessed portion 110 formed at the tip portion of the bucket 100 may have an annular shape on the tip portion of the bucket 100. FIG. 4 is an axial cross-sectional view, and it may be seen that the shape of the recessed portion 110 is formed in the tip portion of the bucket 100.

The packing body 30 may be fixed into a coupling groove 21 of a stationary body 20. The packing body 30 may have an annular shape and may be formed along the coupling groove 21 of the stationary body 20, which is formed in the circumferential direction. The packing body 30 is described to have an "H" cross-section in the embodiment of the present disclosure, but the present disclosure is not limited thereto. The shape of the coupling groove 21 formed in the stationary body 20 of the turbine may be changed so as to correspond to various forms. Both stepped portions for seating 32 of the packing body 30 are seated in the coupling groove 21 of the stationary body 20 so that the packing body 30 is fixedly coupled to the stationary body 20.

The support member 50 may be disposed at the central portion of the packing body 30, and may fix the brush seal 59. The support member 50 may include a first base 51, a first rotary body 52, a first rotary shaft 54, and first inter-packing portions 58.

First, the first base 51 may be seated in a fixing groove 33 of the packing body 30, and may have a first central groove portion 51a which is formed in the inside thereof and has a circular cross-section. The first base 51 may be coupled to the fixing groove 33 by various methods such as welding and bolting.

One side of the first rotary body 52 may be formed as a circular portion 52a having a circular cross-section, and may be disposed in the first central groove portion 51a. The other side of the first rotary body 52 may be formed as an extension portion 52b having a square cross-section, and may support the brush seal 59.

In this case, the first rotary shaft 54 may be inserted into a through-hole formed in the first rotary body 52 and both ends of the first rotary shaft 54 may be connected to the packing body 30, such that the first rotary body 52 is rotatable within the range of a certain angle. Referring to FIG. 6, it may be seen that the first rotary shaft 54 passes through the first rotary body 52 and both ends of the first rotary shaft 54 are connected to the packing body 30.

In order to prevent the rotational interference of the first rotary body 52, inclined portions 51b may be formed at a portion in which the extension portion 52b of the first rotary body 52 is disposed in the first base 51, and the inclined portions 51b are inclined in different directions.

In this case, the inclined portions 51b may be inclined while having the same gradient ($\Phi_1$ or $\Phi_2$), or may be inclined while having different gradients ($\Phi_1$ and $\Phi_2$). Such a gradient may be determined considering the side in which the bucket 100 is excessively axially moved, the direction in which fluid leaks, or the like.

For example, when fluid leaks from the right to the left, the gradient ($\Phi_1$) is set to be smaller than the gradient ($\Phi_2$). Consequently, the brush seal 59 is nearly vertically maintained when the brush seal 59 comes into contact with the associated stepped portion 120 and it is thus possible to block the flow of fluid.

For another example, when the bucket 100 is further moved axially to the right on the basis of the vertical axis of the brush seal, the gradient ($\Phi_1$) is set to be larger than the gradient ($\Phi_2$) so as to enlarge the inclined range of the brush seal 59. Consequently, it is possible to cope with the axial movement of the bucket 100.

The first rotary body 52 may be divided into a plurality of first rotary bodies which are circumferentially arranged along the inner circumference of the packing body 30. Referring to FIG. 6, it may be seen that the first rotary body 52 is divided into a plurality of first rotary bodies, which are circumferentially arranged, so as to correspond to the recessed portion 110 disposed according to the shape of the annular bucket 100.

Such a division structure enables the first rotary body 52 to rotate. That is, the first rotary body 52 must have a rectilinear shape for the rotation of the first rotary shaft 54, but the first rotary body 52 is circumferentially disposed. In addition, the first rotary body 52, in which the brush seal 59 is disposed, must have a round shape for maintaining of sealing. Therefore, through such a division structure, a portion of the first rotary bodies 52, in which the first rotary shaft 54 is disposed, has a rectilinear shape, and a portion of the first rotary bodies 52, in which the brush seal 59 is disposed, has a round shape.

Here, the first interpacking portions 58 may be disposed at both sides of the extension portion 52b of each of the first rotary bodies 52 in order to block the leakage of fluid between the first rotary bodies 52.

Each of the first interpacking portions 58 may consist of a labyrinth seal 58a and a honeycomb seal 58b. That is, the labyrinth seal 58a is disposed at one side of one of the first rotary bodies 52, and the honeycomb seal 58b is disposed at the opposite side of the associated first rotary body 52, thereby preventing the leakage of fluid between the first rotary bodies 52.

One end of the brush seal 59 is fixed to the support member 50, and the other end thereof is disposed in the recessed portion 110.

The tooth portion 31 may be disposed on at least one side of the packing body 30. That is, the tooth portion 31 may be installed at one side (typically, the side in which fluid leakage occurs) or both sides of the packing body 30. In the embodiment of the present invention, the tooth portions 31 are installed at both sides of the packing body 30 to enhance sealing force. In addition, the tooth portion 31 may be a labyrinth seal, but the present disclosure is not limited thereto.

Referring to FIG. 5, when the turbine is driven and the rotary body rotates in the casing, the rotary body is not rotated at an accurate position, but is axially moved due to the collision with fluid, vibration, etc. For this reason, the positions of the brush seal 59 and the tip portion of the bucket 100 are changed.

In this case, a pair of stepped portions 120 is formed at both ends of the recessed portion 110 on the tip portion of the bucket 100. In addition, slight inclined portions 130 may be formed at the upper ends of the stepped portions 120, and the slight inclined portions 130 may be inclined in different directions.

When the rotary body is axially moved, the brush seal 59 comes into close contact with the associated stepped portion 120 or slight inclined portion 130, so as to block the flow of fluid. First, the brush seal 59 comes into contact with the associated stepped portion 120, thereby primarily blocking the leakage of fluid. When the rotary body is excessively axially moved, the first rotary body 52 comes into contact with the associated slight inclined portion 130 while rotating in one direction.

Here, one of the inclined portions 51b of the first base 51 is configured to have the same gradient ($\Phi_1$ or $\Phi_2$) as the slight inclined portion 130 facing therewith, with the consequence that the first rotary body 52 comes into close contact with the associated slight inclined portion 130 so as to prevent the leakage of fluid.

In addition, although not shown in the drawings, an annular sparing may be alternatively disposed around the first rotary shaft 54 in order to return the brush seal 59, which is rotated at a certain angle, to the original position. Thus, the brush seal 59 may be rotated in the direction opposite to the rotation of the first rotary shaft 54 by the elastic force of the spring.

Since the tooth portion 31 is formed outward from the brush seal 59, it is possible to further suppress the leakage of fluid.

Figure 7:
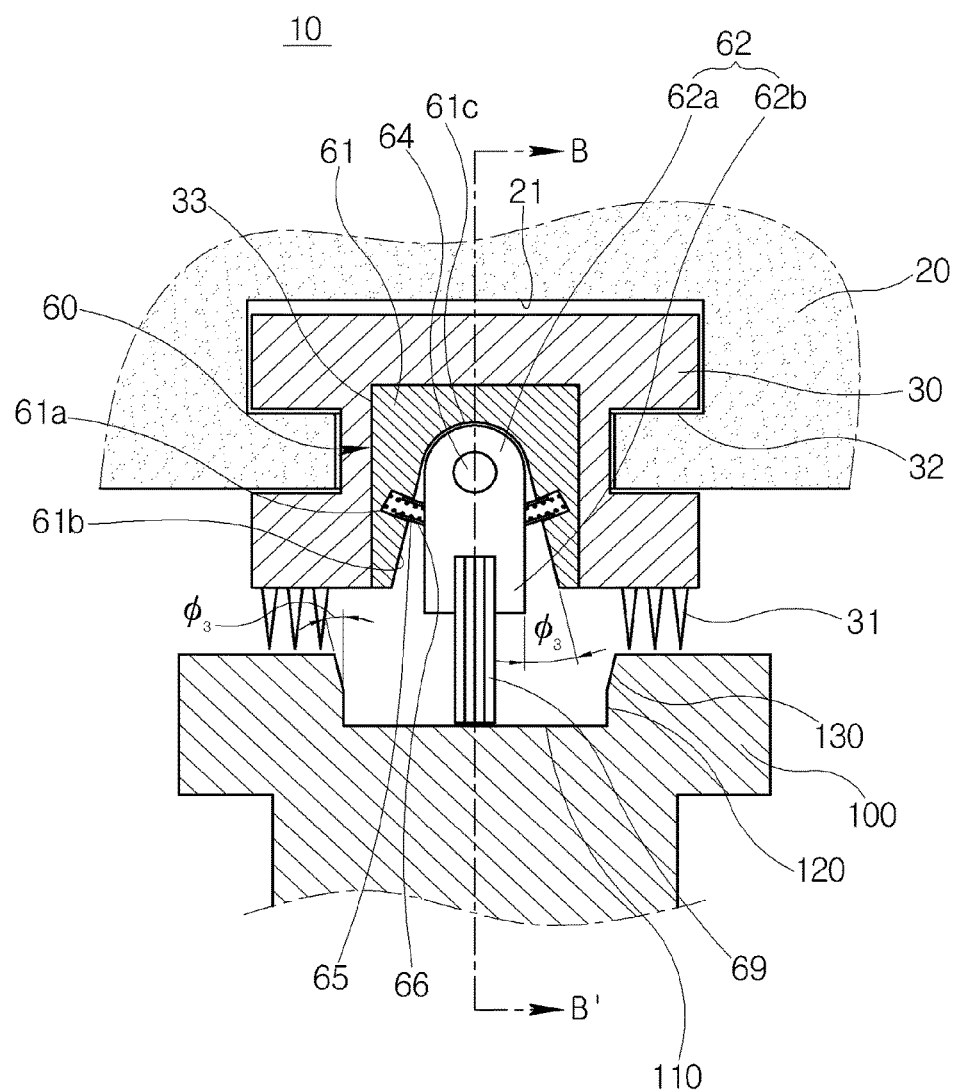
FIG. 7 is a view illustrating a sealing structure for a turbine according to a third embodiment of the present disclosure.
Figure 8:
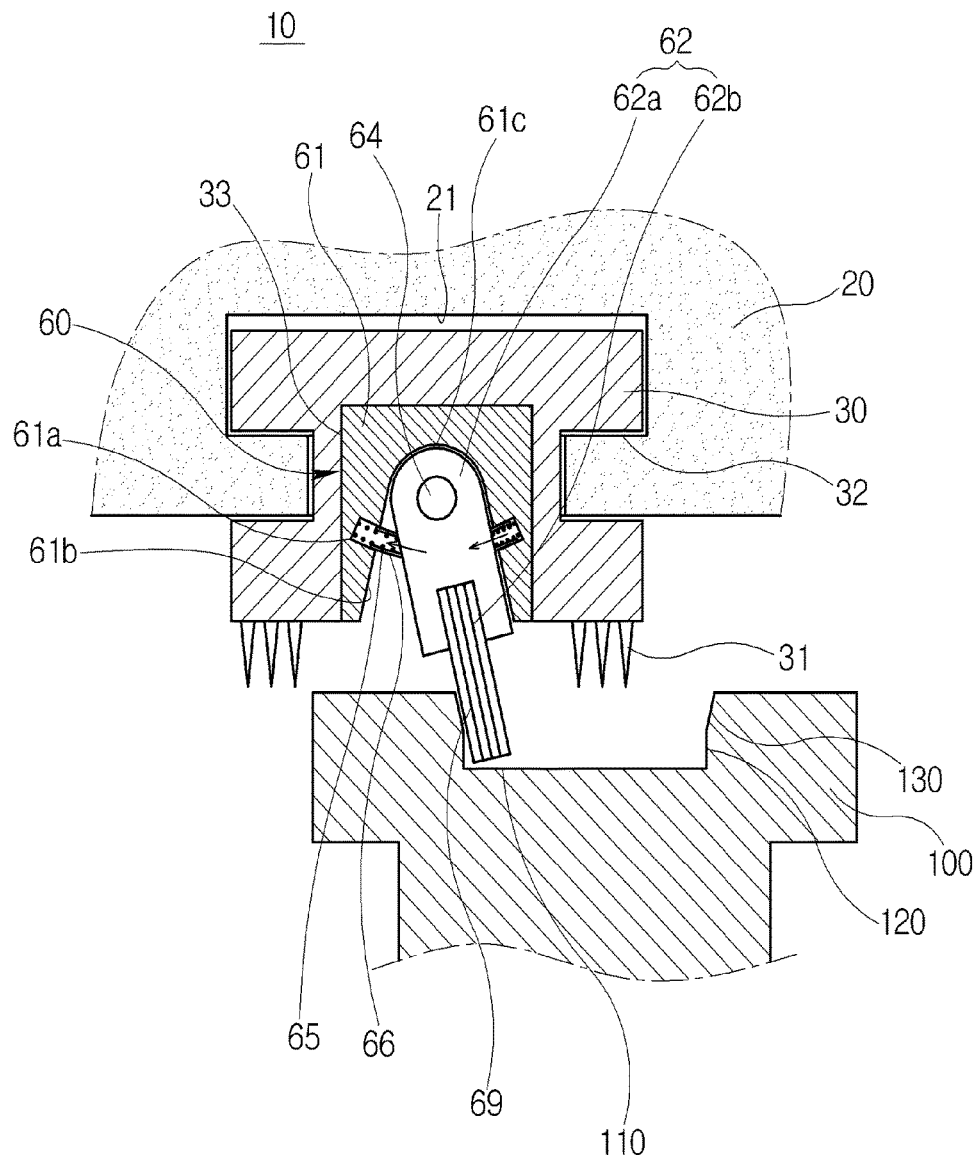
FIG. 8 is a view illustrating the operation state of the structure illustrated in FIG. 7.
Figure 9:
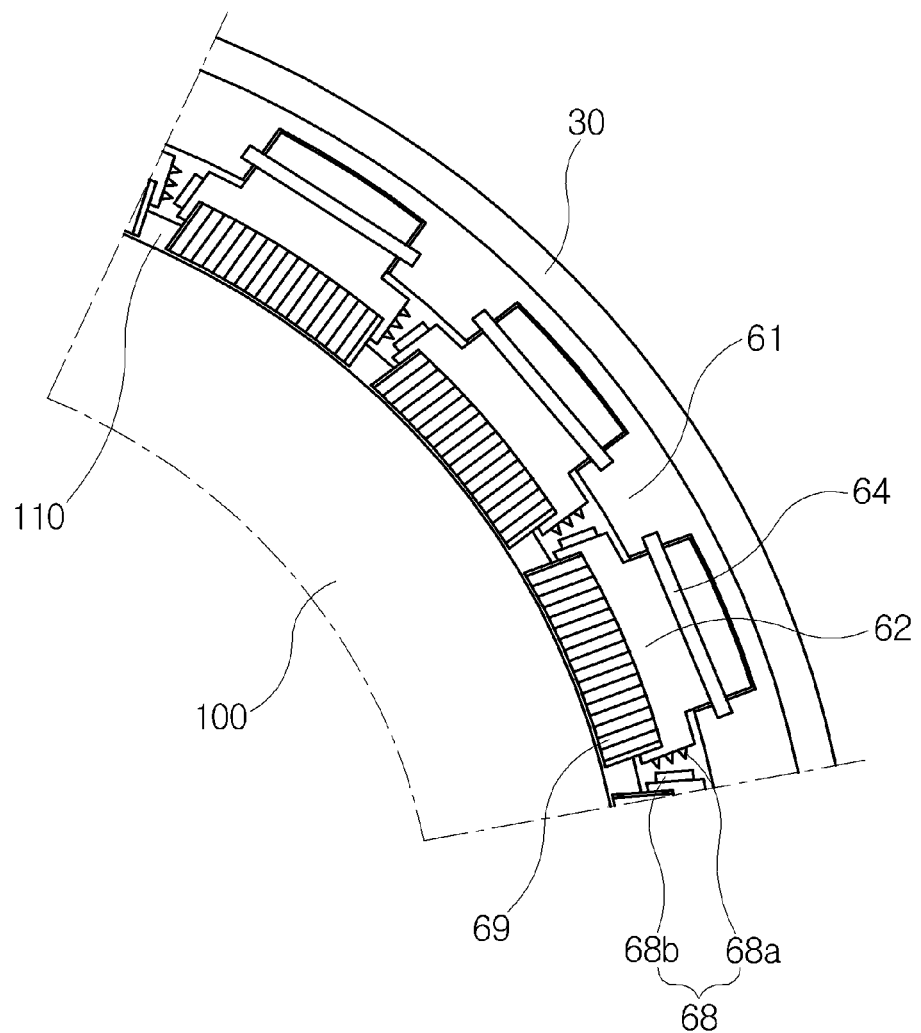
FIG. 9 is a radial cross-sectional view taken along line B-B' of FIG. 7.

FIG. 7 is a view illustrating a sealing structure for a turbine according to a third embodiment of the present disclosure. FIG. 8 is a view illustrating the operation state of the structure illustrated in FIG. 7. FIG. 9 is a radial cross-sectional view taken along line B-B' of FIG. 7.

Referring to FIGS. 7 to 9, the sealing structure for a turbine according to the third embodiment of the present disclosure may include a recessed portion 110, a packing body 30, a support member 60, a brush seal 69, and a tooth portion 31.

First, the recessed portion 110 may have an annular shape and be formed around a rotary body. Here, the rotary body may be preferably a tip portion of a bucket 100, but the present invention is not necessarily limited thereto. For example, the rotary body may be a portion of a rotating component disposed in a gas turbine or a steam turbine. Hereinafter, the rotary body will be described to be the tip portion of the bucket 100 in the embodiment of the present disclosure.

The bucket 100 of the rotary body is disposed in the circumferential direction of the rotary body. Accordingly, the recessed portion 110 formed at the tip portion of the bucket 100 may have an annular shape on the tip portion of the bucket 100. FIG. 4 is an axial cross-sectional view, and it may be seen that the shape of the recessed portion 110 is formed in the tip portion of the bucket 100.

The packing body 30 may be fixed into a coupling groove 21 of a stationary body 20. The packing body 30 may have an annular shape and may be formed along the coupling groove 21 of the stationary body 20, which is formed in the circumferential direction. The packing body 30 is described to have an "H" cross-section in the embodiment of the present disclosure, but the present disclosure is not limited thereto. The shape of the coupling groove 21 formed in the stationary body 20 of the turbine may be changed so as to correspond to various forms. Both stepped portions for seating 32 of the packing body 30 are seated in the coupling groove 21 of the stationary body 20 so that the packing body 30 is fixedly coupled to the stationary body 20.

The support member 60 may be disposed in a fixing groove 33 of the central portion of the packing body 30, and may fix the brush seal 69. The support member 60 may include a second base 61, a second rotary body 62, a second rotary shaft 64, and second interpacking portions 68.

First, the second base 61 may be seated in the fixing groove 33 of the packing body 30, and may have a second central groove portion 61c which is formed in the inside thereof and has a fanwise cross-section. The second base 61 may be coupled to the fixing groove 33 by various methods such as welding and bolting.

One side of the second rotary body 62 may be formed as a round portion 62a, and may be disposed in the second central groove portion 61c. The other side of the second rotary body 62 may be formed as an extension portion 62b having a square cross-section, and may support the brush seal 69.

In this case, the second rotary shaft 64 may be inserted into a through-hole formed in the second rotary body 62 and both ends of the second rotary shaft 64 may be connected to the packing body 30, such that the second rotary body 62 is rotatable within the range of a certain angle. Referring to FIG. 9, it may be seen that the second rotary shaft 64 passes through the second rotary body 62 and both ends of the second rotary shaft 64 are connected to the packing body 30.

In order to prevent the rotational interference of the second rotary body 62, inclined portions 61a may be formed at a portion in which the extension portion 62b of the second rotary body 62 is disposed in the second base 61, and the inclined portions 61b are inclined in different directions.

In this case, the inclined portions 61b may be inclined while having the same gradient ($\Phi_3$), or may be inclined while having different gradients ($\Phi_1$ and $\Phi_2/\Phi_3$), but the present invention is not limited thereto. Such a gradient may be determined considering the side in which the bucket 100 is excessively axially moved, the direction in which fluid leaks, or the like.

The second rotary body 62 may be divided into a plurality of second rotary bodies which are circumferentially arranged along the inner circumference of the packing body 30. Referring to FIG. 9, it may be seen that the second rotary body 62 is divided into a plurality of second rotary bodies, which are circumferentially arranged, so as to correspond to the recessed portion 110 disposed according to the shape of the annular bucket 100.

Such a division structure enables the second rotary body 62 to rotate. That is, the second rotary body 62 must have a rectilinear shape for the rotation of the second rotary shaft 64, but the second rotary body 62 is circumferentially disposed. In addition, the second rotary body 62, in which the brush seal 69 is disposed, must have a round shape for maintaining of sealing. Therefore, through such a division structure, a portion of the second rotary bodies 62, in which the second rotary shaft 64 is disposed, has a rectilinear shape, and a portion of the second rotary bodies 62, in which the brush seal 69 is disposed, has a round shape.

Here, the second interpacking portions 68 may be disposed at both sides of the extension portion 62b of each of the second rotary bodies 62 in order to block the leakage of fluid between the second rotary bodies 62.

Each of the second interpacking portions 68 may consist of a labyrinth seal 68a and a honeycomb seal 68b. That is, the labyrinth seal 68a is disposed at one side of one of the second rotary bodies 62, and the honeycomb seal 68b is disposed at the opposite side of the associated second rotary body 62, thereby preventing the leakage of fluid between the second rotary bodies 62.

One end of the brush seal 69 is fixed to the support member 60, and the other end thereof is disposed in the recessed portion 110.

The tooth portion 31 may be disposed on at least one side of the packing body 30. That is, the tooth portion 31 may be installed at one side (typically, the side in which fluid leakage occurs) or both sides of the packing body 30. In the embodiment of the present invention, the tooth portions 31 are installed at both sides of the packing body 30 to enhance sealing force. In addition, the tooth portion 31 may be a labyrinth seal, but the present invention is not limited thereto.

Referring to FIG. 8, when the turbine is driven and the rotary body rotates in the casing, the rotary body is not rotated at an accurate position, but is axially moved due to the collision with fluid, vibration, etc. For this reason, the positions of the brush seal 69 and the tip portion of the bucket 100 are changed.

In this case, a pair of stepped portions 120 is formed at both ends of the recessed portion 110 on the tip portion of the bucket 100. In addition, slight inclined portions 130 may be formed at the upper ends of the stepped portions 120, and the slight inclined portions 130 may be inclined in different directions.

When the rotary body is axially moved, the brush seal 69 comes into close contact with the associated stepped portion 120 or slight inclined portion 130, so as to block the flow of fluid. First, the brush seal 59 comes into contact with the associated stepped portion 120, thereby primarily blocking the leakage of fluid. When the rotary body is excessively axially moved, the second rotary body 62 comes into contact with the associated slight inclined portion 130 while rotating in one direction.

Here, one of the inclined portions 61a of the second base 61 is configured to have the same gradient ($\Phi_3$) as the slight inclined portion 130 facing therewith, with the consequence that the second rotary body 62 comes into close contact with the associated slight inclined portion 130 so as to prevent the leakage of fluid. Since the tooth portion 31 is formed outward from the brush seal 69, it is possible to further suppress the leakage of fluid.

Meanwhile, in the third embodiment of the present invention, the support member 60 may further include seating grooves 61b, guide bars 65, and elastic bodies 66. The seating grooves 61b may be formed in both sides of the second central groove portion 61c of the second base 61. The guide bars 65 may protrude from both sides of the second rotary body 62 in the direction facing the seating grooves 61b and have a curved shape. In this case, the elastic bodies 66 may be disposed between the guide bars 65 and the seating grooves 61b.

Referring to FIG. 8, when the brush seal 69 comes into contact with the associated slight inclined portion 130, the guide bars 65 do not interfere with the rotation of the second rotary body 62 while one of the guide bars 65 is inserted into the associated seating groove 61b. In this case, one of the elastic bodies 66 is compressed and thus accumulates restoring force, in which case the restoring force acts as force for returning the second rotary body 62 to the original position by pushing the second rotary body 62 in the direction opposite to the rotation thereof by the elastic body 66.

In addition, the other of the elastic bodies 66 is expanded and thus accumulates restoring force, in which case the restoring force acts as force for returning the second rotary body 62 to the original position by pulling the second rotary body 62 in the direction opposite to the rotation thereof by the elastic body 66.

In the third embodiment of the present invention, the brush seal 69 may be rotated corresponding to the axial movement of the rotary body, particularly of the tip portion of the bucket 100, thereby further enhancing sealing force.

As is apparent from the above description, the present invention can maintain sealing force by forming a recessed portion in a bucket tip portion and disposing the brush seal of a stationary body in the recessed portion, unlike the related art, since the brush seal comes into contact with the stepped portions of both sides of the recessed portion to block the leakage of fluid, regardless of the axial movement of a bucket.

In addition, since labyrinth seals are disposed at both sides of the brush seal, it is possible to enhance sealing force at both sides of the bucket.

In addition, since the brush seal disposed in the stationary body is rotatable, and inclined surfaces are formed at the stepped portions of the both sides of the recessed portion of the bucket, sealing force can be maintained owing to the contact between the brush seal and the inclined surfaces when the bucket is axially moved.

Therefore, it is possible to prevent a power loss owing to an improvement in sealing force of the turbine, and to extend the service life of components.

While the present disclosure has been described with respect to the specific embodiments, it will be apparent to those skilled in the art that various changes and modifications may be made without departing from the spirit and scope of the following claims.

Moreover, the above advantages and features are provided in described embodiments, but shall not limit the application of the claims to processes and structures accomplishing any or all of the above advantages.

What is claimed is:

1. A sealing structure for a turbine, comprising:
    a rotary body having an annular shape, a recessed portion being defined around the rotary body;
    a packing body disposed in a coupling groove of a stationary body, the packing body having an annular shape, a radius of the packing body being defined as extending from a center of the annular shape to the packing body, an axial direction being defined as perpendicular to the radius, and a plane being defined by the radius and the axial direction;
    a support member disposed at a central portion of the packing body, the support member including a first central groove defined in a surface of the support member that faces the rotary body, a first sidewall of the first central groove adjacent the surface being inclined in a first direction to form a non-zero angle with the radius of the packing body in the plane, and a second sidewall of the first central groove adjacent the surface being inclined in a second direction to form a non-zero angle with the radius of the packing body in the plane, the second direction being opposite the first direction with respect to the axial direction;
    a brush seal, a first end of the brush seal being coupled to the support member and a second end of the brush seal being is disposed in the recessed portion; and
    a tooth portion disposed in at least one side of the packing body.

2. The sealing structure according to claim 1, wherein the support member has a square cross-section,
    a first side of the support member is disposed in the packing body, and
    a second side of the support member extends toward the rotary body.

3. The sealing structure according to claim 2, wherein the recessed portion includes at least two stepped portions respectively defined in ends of the rotary body such that, when the rotary body is axially moved, the brush seal comes into contact with one of the stepped portions so as to limit a flow of fluid.

4. The sealing structure according to claim 1, wherein the support member includes
    a first base disposed in a fixing groove of the packing body, the first base including the first central groove, and a portion of the first central groove having a circular cross-section, and
    a first rotary body, a first side of the first rotary body having a circular portion that has a circular cross-section and is disposed in the first central groove portion, and a second side of the first rotary body having an extension portion that has a square cross-section to support the brush seal.

5. The sealing structure according to claim 4, wherein
    the first and second side walls of the support member are respectively disposed between the portion of the first central groove having the circular cross-section and the surface of the support member, and
    the extension portion of the first rotary body is disposed between the first and second inclined portions of the first base.

6. The sealing structure according to claim 5, wherein the support member includes a first rotary shaft disposed in a through-hole defined in the first rotary body.

7. The sealing structure according to claim 6, wherein the first rotary body is divided into a plurality of first rotary bodies circumferentially arranged along an inner circumference of the packing body.

8. The sealing structure according to claim 7, wherein first interpacking portions are disposed at sides of the extension portion of each of the first rotary bodies to limit leakage of fluid between the first rotary bodies.

9. The sealing structure according to claim 4, the recessed portion includes at least two stepped portions respectively defined in ends of the rotary body such that, when the rotary body is axially moved, the brush seal comes into contact with one of the stepped portions so as to limit a flow of fluid.

10. The sealing structure according to claim 9, wherein the stepped portions respectively include inclined portions at upper ends of the stepped portions, the inclined portions of the stepped portions being inclined in different directions, and when the rotary body is axially moved, the brush seal comes into contact with one of the inclined portions of the stepped portions so as to limit a flow of fluid.

11. The sealing structure according to claim 10, wherein one of the inclined portions of the stepped portions has a same gradient as an inclined portion of the first base facing the one of the inclined portions.

12. The sealing structure according to claim 4, wherein the support member includes a second base disposed in the fixing groove of the packing body, the second base having a circular cross-section and a second central groove portion defined therein, and a second rotary body, a first side of the second rotary body having a circular portion that has a circular cross-section and is disposed in the second central groove portion, and a second side of the second rotary body having an extension portion that has a square cross-section to support the brush seal.

13. The sealing structure according to claim 12, wherein the support member includes a second rotary shaft disposed in a through-hole defined in the second rotary body, and ends of the second rotary shaft are coupled to the packing body so as to support rotation of the second rotary body.

14. The sealing structure according to claim 13, wherein the support member includes seating grooves defined in sides of the second central groove portion of the second base;

guide bars protruding toward the seating grooves from sides of the second rotary body, each guide bar having a curved shape; and elastic bodies disposed between the respective guide bars and the respective seating grooves.

15. The sealing structure according to claim 14, wherein the second rotary body is divided into a plurality of second rotary bodies circumferentially arranged along an inner circumference of the packing body.

16. The sealing structure according to claim 15, wherein second interpacking portions are disposed at sides of the extension portion of each of the second rotary bodies to limit leakage of fluid between the second rotary bodies.

17. The sealing structure according to claim 12, wherein the recessed portion includes at least two stepped portions respectively defined in ends of the rotary body such that, when the rotary body is axially moved, the brush seal comes into contact with one of the stepped portions so as to limit a flow of fluid.

18. The sealing structure according to claim 17, wherein the stepped portions respectively include inclined portions at upper ends of the stepped portions, the inclined portions of the stepped portions being inclined in different directions, and when the rotary body is axially moved, the brush seal comes into contact with one of the inclined portions of the stepped portions so as to limit a flow of fluid.

* * * * *